May 25, 1971   K. A. HIRSCHEY   3,579,673
COMBINATION CAR SEAT AND CRIB
Filed Dec. 3, 1968
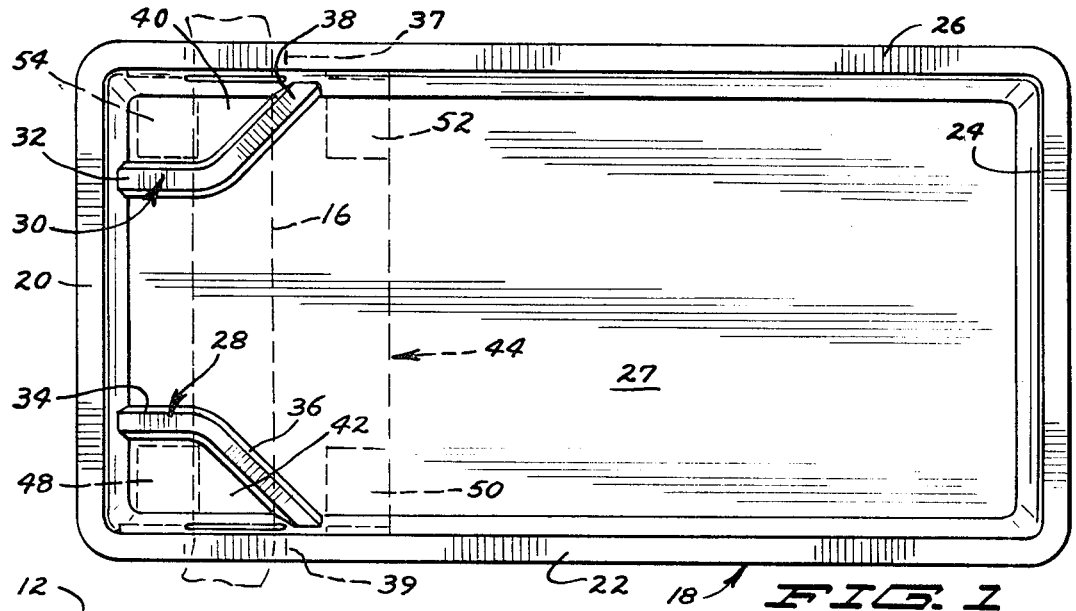
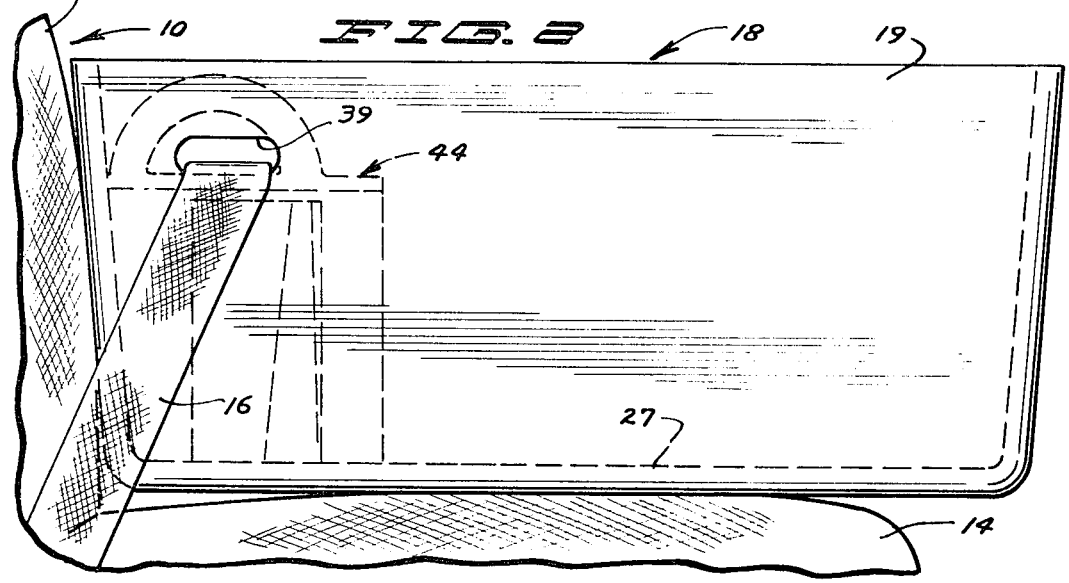
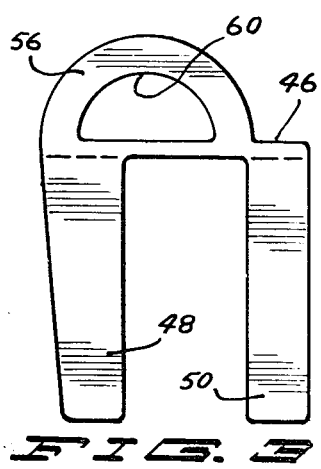
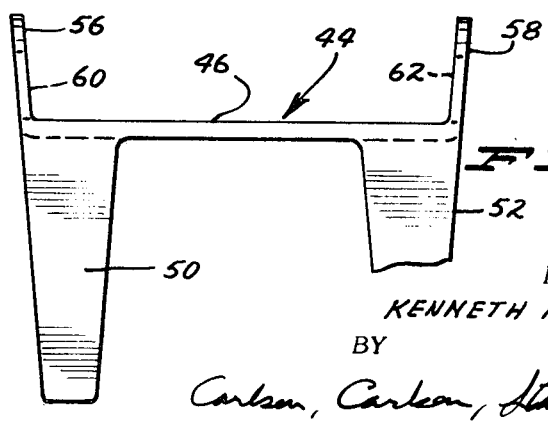
INVENTOR.
KENNETH A. HIRSCHEY
BY
Carlsen, Carlsen, Sturm & Dicke
ATTORNEYS

United States Patent Office 3,579,673
Patented May 25, 1971

3,579,673
COMBINATION CAR SEAT AND CRIB
Kenneth A. Hirschey, 6804 Southdale Road,
Edina, Minn. 55435
Filed Dec. 3, 1968, Ser. No. 780,818
Int. Cl. A62b *35/00;* A47d *7/00, 9/00*
U.S. Cl. 5—94          9 Claims

ABSTRACT OF THE DISCLOSURE

A combination car seat and crib for children including a crib portion composed of a bottom wall and four vertical walls formed from a strong lightweight molded material, e.g. foamed polystyrene, within which the child lies when sleeping. The child's head is cradled between energy absorbing bumpers consisting of vertical partitions molded integrally with the crib at one end. A removable seat slides into place above the partition. Seat belts normally provided with the car secure the crib or crib and seat in place and also function to hold the child in the seat.

---

The present invention relates to children's car seats and more particularly to an improved safety seat for children which can also be utilized as a crib.

Many prior automobile seating arrangements have been proposed for infants and small children. The most common of these consists of a seat with a pair of rearwardly extending downwardly curved hooks for securing the child's seat to the upper aspect of the seat normally used by the occupants of the vehicle. One problem with a seat of this kind is that there is no secure provision for reliably holding it in place in the event of an accident and it can be seen that if the seat swings forwardly, the child's seat will be free to fall toward the front of the passenger compartment. Another problem is that a child cannot sleep comfortably in a seat of this kind.

In another approach to this problem, it has been proposed to provide a child's bassinette for the front seat of the automobile. The bassinette is secured to the seat by means of straps similar to the safety belts in a car. This approach also has certain inherent deficiencies. One is that the child's head is free to move and would therefore be jostled about as the vehicle experiences the normal bumps and vibrations.

In view of these and other deficiencies of the prior art, it is one object of the present invention to provide an improved safety car seat of the type described which is reliably held in place by the seat belts normally provided as a part of the automobile.

Another object of the invention is the provision of an improved device of the character described which functions both as a seat and as a crib.

Another object of the invention is the provision of an improved combination seat and crib of the type described in which existing seat belts provided in the car serve to hold the crib, the seat and the child securely in place.

A further object of the invention is the provision of an improved seat and crib of the character described with an energy-absorbing bumper for preventing the child's head from being jostled as the vehicle experiences the normal shock and vibration of highway travel.

Another object of the invention is the provision of an improved combination seat and crib of the type described in which bumpers are provided to cradle the head of the child and at the same time function as a support for the seat when the seat is placed in the operative position.

A further object of the invention is the provision of an improved combination seat and crib of the type described in which partitions are provided on each side at one end of the crib at a predetermined spacing from the side walls of the crib to define wells for receiving portions of the seat for the purpose of at least partially retaining the seat in the operative position.

These and other more detailed and specific objects of the invention will become apparent in view of the following specifications and drawings wherein:

FIG. 1 is a side elevational view of a device embodying the invention as seen when placed on the seat of an automobile.

FIG. 2 is a plan view of the device.

FIG. 3 is a side elevational view of the seat and

FIG. 4 is a front elevational view of the seat.

In brief terms, the present invention provides a child's safety seat and crib to be used in an automobile. It is comprised of a crib portion and a seat portion. The seat may be placed in an operative position on the crib when it is to be used or removed when the child is to lie down in the crib. The crib consists of an enclosure comprised of sides and a bottom portion, partitions at one end of the crib form bumpers for supporting the child's head. In a preferred form of the invention, at least two of the legs of the seat extend into the space between the partition of the side walls of the crib. Holes are provided in the side walls of the crib for receiving the automobile seat belt. Laterally spaced openings are provided on the seat in alignment with the openings in the side walls of the crib. The seat belt, when in use, extends through the openings of both the crib and the seat and functions to secure both the seat and the child in place.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be eemployed.

Referring now to the drawings there is shown the front seat 10 of a vehicle. The seat includes the back portion 12 and seat portion 14. Secured in place on the seat 10 by means of a conventional existing seat belt 16 (provided as a part of the automobile) is the combination safety seat and crib indicated generally by the numeral 18.

Crib 19 consists of four vertically disposed side walls 20, 22, 24 and 26, each of which slopes outwardly at a small angle proceeding toward the upper edge, and a generally horizontally disposed bottom wall 27. A pair of integral bumper portions 28 and 30 are provided at the end of the crib nearest the seat 10. Bumpers 28 and 30 each consist of a partition including portions 32 and 34 which are aligned with the longitudinal axis of the crib and diagonal portions 36 and 38 which extend toward the sides thereof respectively. Partitions 28 and 30 are disposed vertically and are integral with the side walls 20, 22 and 26 and with bottom wall 27. Side walls 22 and 26 are provided with openings 37 and 39 at a position just above the upper edge of the partitions 28 and 30.

As seen in FIG. 2, the partitions 28 and 30 and the adjacent side walls define a pair of wells 40 and 42 and it is into these wells that the legs of the seat extend as will be described below.

As can be seen in FIG. 1 the upper edges of partitions 28 and 30 are spaced somewhat below the upper edge of side walls 20, 22, 24 and 26 and it is upon the upper edge of the partition that the seat 44 is placed when it is to be used. Seat 44 includes a flat horizontally disposed supporting surface 46, four vertically disposed legs 48, 50, 52 and 54 and a pair of vertically disposed longitudinally aligned flanges 56 and 58 which are provided with openings 60 and 62 respectively through which the